Patented Mar. 4, 1947

2,417,034

UNITED STATES PATENT OFFICE 2,417,034

BUTADIENE EMULSION POLYMERIZATION IN THE PRESENCE OF WATER SOLUBLE COMPLEX METAL CYANIDES

Mortimer A. Youker, Cragmere, Del., assignor to E. I. du Pont de Nemours & Company, Wilmington, Del., a corporation of Delaware No Drawing. Application May 30, 1942, Serial No. 445,219

20 Claims. (Cl. 260—86.5)

This invention relates to the polymerization of unsaturated organic compounds and, more particularly, to regulating and accelerating such polymerizations when carried out in aqueous dispersions by means of complex cyanides.

Many catalysts are known for the polymerization of unsaturated organic compounds, the most important being peroxides and salts of per acids. There are, however, definite limits to the acceleration which is practically obtainable by means of these substances. Moreover, in many cases, the acceleration is only temporary and a great decrease in rate occurs towards the end of the polymerization with the result that, in many cases, satisfactory yields cannot be obtained in any reasonable length of time. It is obvious that the acceleration of polymerization and the obtaining of quantitative yields is of great importance, particularly where the resulting products are vital war materials such as, for example, the various types of synthetic rubber. In addition to increasing production, improved methods for accelerating polymerization are also much needed in many cases where a lower temperature of polymerization would have desirable effects upon the properties of the product, but where the polymerization is excessively slow by previous methods at these lower temperatures. Furthermore, improved methods for accelerating polymerization would be valuable where the polymerization, as at present carried out, proceeds so rapidly in its early stages that it is hard to remove the heat generated, but, on the other hand, becomes so slow toward the end that an impractically long time is required for high yield. No generally satisfactory method is now available for accelerating the polymerization during these last stages since, in general, the addition of the active polymerization catalyst such as persulfate during the course of the emulsion polymerization causes coagulation.

It is, therefore, an object of the present invention to provide an improved method for accelerating polymerization in aqueous dispersion. Another object is to provide a method of polymerization which proceeds rapidly to a quantitative yield. A third object is to provide a method for accelerating the later stages of emulsion polymerization. Other objects will appear hereinafter.

These objects are accomplished according to the present invention by having present during at least a part of the polymerization a water soluble ferricyanide, cobalticyanide, nickelicyanide, molybdicyanide, mercuricyanide, a complex cyanide of zinc, copper, or silver, or a mixture of two or more of these. Preferably, a water-soluble persulfate is also present. The complex cyanide need not be added as such, but may be formed in the dispersion before or during the polymerization. The process is applicable generally to polymerizable unsaturated compounds and particularly to conjugated 1,3-dienes, such as 1,3-butadiene and chloroprene (2-chloro-1,3-butadiene), alone or in combination with each other or with other polymerizable unsaturated compounds.

The following examples illustrate, but do not limit, the invention. Parts are given by weight.

Example I

One hundred (100) parts of chloroprene which has been distilled in a nitrogen atmosphere immediately before use in order to remove the chloroprene peroxides and which contained one-half (½) part of sulfur and 4 parts of rosin in solution was emulsified in 172 parts of water containing 0.82 part of sodium hydroxide, 0.39 part of potassium ferricyanide and 0.5 part of the sodium salts of the dinaphthylmethane sulfonic acids prepared according to U. S. Patent No. 1,336,759 from naphthalene, formaldehyde, and sulfuric acid. This aqueous solution was first freed from dissolved air by applying reduced pressure and an atmosphere of oxygen-free nitrogen was then maintained over it and the chloroprene solution was emulsified therein by gradual addition with agitation by means of a paddle type mechanical stirrer. A nitrogen atmosphere and gentle mechanical agitation were maintained throughout the polymerization period. The temperature rose to 40° C. as a result of the polymerization and was maintained at this point by external cooling of the vessel in which the polymerization was carried out. In 35 minutes, 80 per cent of the chloroprene had polymerized as determined from the specific gravity of the dispersion. In a parallel experiment in which 0.5 part of potassium persulfate was substituted for potassium ferricyanide, the amount of polymer formed at the end of 35 minutes was only 35 per cent. In the absence of both persulfate and ferricyanides, scarcely any polymer was formed in 35 minutes. In the presence of the ferricyanide, the polymerization proceeded rapidly to completion, yielding a latex similar to those prepared according to U. S. Patent No. 2,264,173 and, consequently, capable of giving a plastic, rubber-like material by application of the process of U. S. Patent No. 2,234,215.

Example II

One hundred (100) parts of chloroprene containing 0.6 part of sulfur and 4 parts of rosin in solution was emulsified by rapid stirring in 170 parts of water containing 0.82 part of sodium hydroxide, 0.5 part of potassium ferrocyanide trihydrate, 0.5 part of potassium persulfate and 0.75 part of the sodium salts of the dinaphthylmethane sulfonic acids referred to in Example I. The polymerization was carried out at 10° C. in a nitrogen atmosphere as in Example I. After 3 hours, the yield was practically quantitative. Without taking precautions to exclude atmospheric oxygen, the yield was quantitative in about 5 hours. Similar results were obtained when 0.5 part of potassium ferricyanide was used in place of the potassium ferrocyanide.

Example III

One hundred (100) parts of chloroprene containing 0.25 part of sulfur and 4 parts of rosin in solution was emulsified in 94 parts of water containing 1.06 part of sodium hydroxide and 0.3 part of potassium persulfate. A 10 per cent solution containing 0.25 part of potassium ferricyanide was then added. The temperature was allowed to rise to 40° C. and then was maintained at that temperature by externally cooling the vessel in which the polymerization was carried out. An atmosphere of nitrogen was maintained during the emulsification and polymerization. At the end of 195 minutes, 93 per cent of the chloroprene was polymerized. In a parallel experiment without potassium ferricyanide, at the end of 195 minutes only 87 per cent was polymerized. When, on the other hand, the potassium ferricyanide was added in the form of a 10 per cent aqueous solution, after the polymerization had proceeded for 1 hour, 93 per cent polymerization was reached only 135 minutes from the start. After polymerization, the latices were stabilized by the addition of 2 parts of diethanolamine and were then ready for use according to the procedures and for the purposes already disclosed, for example, in U. S. Patent No. 2,264,173.

Example IV

Ninety (90) parts of chloroprene and 10 parts of 1,3-butadiene containing, in solution, 4 parts of rosin and 0.45 part of sulfur were emulsified in 171 parts of water containing 0.82 part of sodium hydroxide, 0.5 part of potassium persulfate, 0.5 part of potassium ferrocyanide trihydrate and 0.75 part of the sodium salts of the dinaphthylmethane sulfonic acids referred to in Example I. The polymerization was carried out at 15° C. in an open vessel without taking precautions to exclude air. After 5 hours at this temperature, approximately 90 per cent of the chloroprene and butadiene had polymerized. The dispersion was then treated with 2.5 parts of tetraethyl thiuram disulfide dispersed in an emulsifying solution. After standing for 16 hours at ordinary temperature, the dispersion was acidified with acetic acid and coagulated by the addition of saturated sodium chloride. The resulting coagulum was washed, dried, and plasticized as already described in U. S. Patent No. 2,234,215. Without the use of potassium ferrocyanide, the polymerization was much slower. Because of the presence of the 1,3-butadiene, which entered into the composition of the resulting interpolymer and also because of the low temperature of polymerization, the product had exceptionally good processing characteristics combined with an increased ability to remain pliable at low temperatures in the cured state.

Example V

One hundred (100) parts of chloroprene was dispersed in a solution of 173 parts of water containing 0.2 part of sodium hydroxide and 0.5 part of potassium ferricyanide and 4 parts of the sodium salts of the dinaphthylmethane sulfonic acids referred to above. The polymerization was carried out at 20° C. in an atmosphere of air. At the end of 165 minutes, 90 per cent of the chloroprene had been polymerized.

Example VI

A solution of 4 parts of rosin, 0.6 part of sulfur in 100 parts of chloroprene was emulsified in 171 parts of water containing 0.82 part sodium hydroxide, 0.5 part of potassium persulfate, 0.2 part of potassium cobalticyanide $K_3Co(CN)_6$ and 0.7 part of the sodium salts of the dinaphthylmethane sulfonic acids above referred to. The polymerization was carried out at 40° C. in an atmosphere of air with gentle mechanical agitation. A practically quantitative yield was obtained in 2 hours. In a similar experiment in which potassium ferrocyanide was used in place of potassium cobalticyanide, the polymerization was practically complete in 1 hour, but when neither complex cyanide was used, polymerization was incomplete even in 4 hours.

Example VII

The process of Example VI was repeated with potassium molybdicyanide $K_4Mo(CN)_8.H_2O$ used in place of the cobalticyanide. Similar results were obtained.

Example VIII

Potassium mercuricyanide $K_2Hg(CN)_4$ used in the process of Examples VI and VII gave similar results.

Example IX

Fifty-five (55) parts of 1,3-butadiene and 45 parts of acrylic nitrile containing 0.5 part of octyl mercaptan and 4 parts of oleic acid were introduced into a tube with 150 parts of water containing 1.08 part of sodium hydroxide, 0.5 part of potassium persulfate, 0.5 part of potassium ferrocyanide and 1 part of the sodium salts of the dinaphthylmethane sulfonic acids referred to in earlier examples. The tube was then sealed and rotated end for end about a horizontal axis in a bath which was maintained at 30° C. By this procedure, the butadiene and acrylic nitrile were dispersed in the aqueous phase and polymerized with the formation of a latex. The polymerization was practically complete in 6 hours. The latex was then coagulated by the addition of a saturated sodium chloride solution, followed by dilute acetic acid, after treatment with 2.5 parts of a eutectic mixture of 55 parts of phenyl alpha naphthylamine and 45 parts of diphenylamine dispersed in a solution of dispersing agents like that used in the polymerization. After washing with water and drying in the usual way on a warm rubber mill, the coagulum formed a readily processed, plastic rubber-like material which, when cured, showed exceptionally good resistance to swelling action of petroleum hydrocarbons. Potassium molybdicyanide used in place of the potassium ferrocyanide gave similar results. On the other hand, when no cyanide was used (but the indicated quantity of potassium persulfate was still present), the yield in 6 hours was only 36 per cent. Potassium mercuricyanide, potassium nickelicyanide, and potassium cobalticyanide, when used in the same proportions as the ferrocyanide, likewise greatly accelerated the polymerization.

*Example X*

Eighty (80) parts of 1,3-butadiene and 20 parts of dimethyl vinylethynyl carbinol (described in U. S. Patent No. 1,963,935) were polymerized as in Example IX, using 1 part of a mixture of straight-chain primary mercaptans containing an average of 13 carbon atoms, 0.75 part of sodium hydroxide, 1 part of potassium persulfate, 0.05 part of potassium ferricyanide along with the quantities of oleic acid, water, and dinaphthylmethane sulfonates described in the example. The polymerization temperature was 40° C. At the end of 20 hours, the resulting latex was coagulated and the products worked up as described in Example IX, yielding 90 parts of a plastic, readily processed product. Without the potassium ferricyanide, 35 hours were required to obtain the same yield.

*Example XI*

Seventy-five (75) parts of butadiene and 25 parts of styrene were polymerized like the butadiene and carbinol in Example X except that 0.75 part of mercaptan was used. Ninety-four (94) parts of product were obtained in 18 hours at 40° C.

*Example XII*

One hundred (100) parts of methyl methacrylate was dispersed in a solution in 122 grams of water of 0.1 part of potassium ferricyanide, 1.12 part of sodium hydroxide, 1 part of ammonium persulfate, and 4 parts of oleic acid and 1 part of the sodium salts of the dinaphthylmethane sulfonic acids referred to in preceding examples. Polymerization was carried out at 40° C. A latex-like dispersion of polymerized methyl methacrylate resulted. In the absence of the ferricyanide, the polymerization was much slower.

*Example XIII*

Seventy-five (75) parts of 1,3-butadiene, 20 parts of styrene and 5 parts of dimethyl vinylethynyl carbinol were polymerized as in Examples IX, X, and XI, using 0.75 part of a mixture of straight-chain primary mercaptans containing an average of 13 carbon atoms, 0.05 part of potassium ferricyanide, 1 part of potassium persulfate, 1.075 part of sodium hydroxide, 4 parts of oleic acid, 150 parts of water and 1 part of the dinaphthyl methane sulfonate referred to in Example I. The polymerization was carried out at 40° C. for 19 hours and the resulting latex was worked up as described in Example IX, yielding 91 parts of a plastic, readily processed product which yielded a strong, resilient vulcanizate when cured.

As illustrated in the examples, the present invention includes the use of water-soluble complex cyanides of various metals in which the metal is often in a higher state of oxidation. Sodium, potassium, and ammonium complex cyanides are preferred. Instead of adding the complex cyanide as such, it is often more convenient and advantageous to form it in the dispersion either before or during polymerization. Thus, a soluble cyanide and a soluble salt of the metals corresponding to the complex cyanide which it is desired to use may be added. When a complex cyanide with the metal in the high state of oxidation is to be used, it is often convenient to add a complex cyanide in which the metal is in the lower state of oxidation (when this is more readily procurable) along with an oxidizing agent which is capable of oxidizing it to the higher state. This method has the further advantage of forming the desired complex cyanide gradually during the course of the polymerization and thus distributing its effect through the later stages when the acceleration of the polymerization is particularly desirable. Thus, it is often possible, by proper choice of the concentrations of the agents, to exercise very close control over the rate of the polymerization throughout. Acceleration in the later stages of polymerization may also be brought about, as illustrated in Example III, by adding the complex cyanide to the partly polymerized emulsion after the rapid initial polymerization is over.

Irrespective of whether the complex cyanide is added in the oxidized or the reduced state, it is often advantageous to have also present during the polymerization a second polymerization catalyst of the peroxide type such as hydrogen peroxide, benzoyl peroxide, a perborate, percarbonate, or preferably a persulfate. The persulfates are also preferred to oxidize the complex cyanides in the lower state of oxidation. Any of the water-soluble persulfates, such as ammonium persulfate or potassium persulfate is suitable. The amounts of complex cyanide and of peroxide type catalyst are preferably from 0.01 to 1 per cent and about 0.1 to 1 per cent, respectively, of the weight of the total quantity of polymerizable material employed, although smaller quantities have definite effect and larger quantities are desirable in some cases.

In addition to the complex cyanides used in the above examples, the water-soluble complex cyanides of zinc, copper, and silver may also be used to accelerate polymerization of the type described above according to the present invention. In the case of certain complex cyanides, for example, those of copper, the catalytic effect is much increased by adding also a water-soluble cyanide such as sodium or potassium cyanide. It has also been found that combinations of two or more different complex cyanides often have greater effects than the individual compounds. Thus, in a polymerization system like that used in Example VI, 0.07 part each of potassium zinc cyanide, potassium cuprocyanide, and potassium ferricyanide together have a much greater accelerating effect than any of these alone or even than 0.2 part of the ferricyanide.

The process of the present invention is preferably carried out in the absence of oxygen since, as illustrated in Example II, more rapid polymerization is obtained thereby. The invention is, nevertheless, applicable to polymerization in the presence of air and gives valuable acceleration under these conditions also.

As stated above, the present invention is applicable generally to polymerization reactions and is particularly applicable to the polymerization of 1,3-dienes or mixtures containing them. Suitable dienes for the practice of the invention are the conjugated butadiene hydrocarbons (such as 1,3-butadiene, isoprene, and 2,3-dimethyl-1,3-butadiene) and the haloprenes (such as chloroprene and bromoprene) or mixtures of two or more of these 1,3-dienes. It is often advantageous, particularly in the case of the 1,3-butadiene hydrocarbons, to polymerize in the presence of another polymerizable compound which, in many cases, enters into chemical combination with the 1,3-diene. Preferred polymerizable compounds for this purpose are styrene, acrylic nitrile, methacrylic nitrile, vinylidene chloride, methyl vinyl ketone, dialkyl vinylethynyl carbinols, the acrylic and methacrylic esters and similar compounds which themselves yield rubber-like interpolymers with 1,3-butadiene. However, the 1,3-diene is preferably the preponderant material; i. e., at least 50 per cent of the total polymerizable material. In general, then, the present invention may be applied to any of the known processes for the emulsion polymerization of these 1,3-dienes. Thus, as brought out in some of these examples, the use of complex cyanides of the kind disclosed herein is particularly advantageous in those processes in which a 1,3-diene is polymerized in emulsion in the presence of sulfur and, if desired, is subsequently given a plasticizing treatment as disclosed in U. S. Patent No. 2,234,204 for 1,3-butadiene hydrocarbons and in U. S. Patent No. 2,234,215 and in U. S. Patent No. 2,264,173 for chloroprene. The process is, of course, also applicable when no sulfur or other modifying agent is present as in Example V or where a modifying agent such as hydrogen sulfide (see U. S. Patent No. 2,163,250), sulfur dioxide (see British Patent No. 497,420), mercapto compounds (see U. S. Patent No. 2,227,517), certain quinones (see U. S. Patent No. 2,227,518), and sulfinic acids (see U. S. Patent No. 2,227,219) are present with chloroprene or where mercaptans are present with butadiene as illustrated in Example IX. When working with these readily oxidizable modifying agents, however, care should be taken that their reaction with the oxidizing agent present does not proceed under the conditions of polymerization at such a rate that either the oxidizing agent or the oxidizable compound is excessively consumed during the polymerization. The use of the invention with vinyl compounds, other than dienes, is illustrated in Example XII.

It is clear from what has been said above that the various ingredients and steps in the progress of the present invention can be varied in the same manner with much the same results as have already been discussed in connection with other polymerization processes for chloroprene and 1,3-butadiene, for example, in U. S. Patents Nos. 2,264,173 and 2,234,204. Thus, with respect to chloroprene, other polymerizable substances may be present as discussed on page 4, column 2, lines 11-32 of U. S. Patent No. 2,264,173 and the kind and quality of emulsifying agent and the hydrogen ion concentration may be selected as discussed starting on page 4, column 2, line 33 and ending on page 5, column 2, line 41 of the same patent. Similarly, the ratio of dispersed to dispersing phase and the methods of emulsification are discussed in this patent starting on page 5, column 2, line 68 and ending on page 6, column 1, line 22. The same topics with respect to the polymerization of 1,3-butadiene are discussed in U. S. Patent No. 2,234,204, page 3, column 2, line 1 to page 4, column 1, line 7, page 4, column 2, lines 11-52, and page 4, column 2, lines 53-69, and page 4, column 2, line 70, page 5, column 1, line 22. The disclosures of the above-mentioned patents are made a part hereof by reference.

The temperature at which the polymerization can be carried out lies in the range between 0° C. and 100° C. as described for other polymerizations of chloroprene, 1,3-butadiene, etc., but it should be noted that, because of the much more rapid polymerization obtained by the process of the present invention, it is possible to operate at a considerably lower temperature and still carry out the polymerization in the same time as required by the previous methods. One advantage of this operation at lower temperature is that, in the case of butadiene, the pressure of the polymerizing system is very much reduced and, consequently, less elaborate polymerization equipment need be used. Thus, in Example IV where 10 per cent of 1,3-butadiene is used with chloroprene, it has been found possible to carry out the polymerization in open kettles at 15° C. without serious loss of butadiene by evaporation. A still more important advantage of operation at low temperature has been found to be the greatly improved behavior of the resulting product in milling and other processing operations.

It is apparent that many widely different embodiments of this invention may be made without departing from the spirit and scope thereof, and, therefore, it is not intended to be limited except as indicated in the appended claims.

I claim:

1. The process which comprises polymerizing a polymerizable material which is preponderantly a 1,3-diene of the class consisting of the conjugated butadiene hydrocarbons and beta-halogen-1,3-butadienes in aqueous emulsion in the presence of a water soluble complex cyanide of the group consisting of ferricyanides, cobalticyanides, nickelicyanides, molybdicyanides, mercuricyanides, complex cyanides of zinc, copper, and silver, and mixtures of such complex cyanides, the polymerization being carried out in an inert atmosphere.

2. The process which comprises polymerizing a 1,3-diene of the class consisting of the conjugated butadiene hydrocarbons and beta-halogen-1,3-butadienes in aqueous emulsion in the presence of a peroxide compound and a water soluble complex cyanide of the group consisting of ferricyanides, cobalticyanides, nickelicyanides, molybdicyanides, mercuricyanides, complex cyanides of zinc, copper, and silver, and mixtures of such complex cyanides.

3. The process which comprises polymerizing a 1,3-diene of the class consisting of the conjugated butadiene hydrocarbons and beta-halogen-1,3-butadienes in aqueous emulsion in the presence of a peroxide compound and a water soluble complex cyanide of the group consisting of ferricyanides, cobalticyanides, nickelicyanides, molybdicyanides, mercuricyanides, complex cyanides of zinc, copper, and silver, and mixtures of such complex cyanides, the polymerization being carried out in an inert atmosphere.

4. The process which comprises polymerizing a polymerizable material which is preponderantly 2-chloro-1,3-butadiene in aqueous emulsion in the presence of a water soluble complex cyanide of the group consisting of ferricyanides, cobalticyanides, nickelicyanides, molybdicyanides, mercuricyanides, complex cyanides of zinc, copper, and silver, and mixtures of such complex cyanides.

5. The process which comprises polymerizing a polymerizable material which is preponderantly 2-chloro-1,3-butadiene in aqueous emulsion in the presence of a water soluble complex cyanide of the group consisting of ferricyanides, cobalticyanides, nickelicyanides, molybdicyanides, mercuricyanides, complex cyanides of zinc, copper, 6. The process which comprises polymerizing 2-chloro-1,3-butadiene in aqueous emulsion in the presence of a peroxide compound and a water soluble complex cyanide of the group consisting of ferricyanides, cobalticyanides, nickelicyanides, molybdicyanides, mercuricyanides, complex cyanides of zinc, copper, and silver, and mixtures of such complex cyanides.

7. The process which comprises polymerizing 2-chloro-1,3-butadiene in aqueous emulsion in the presence of a peroxide compound and a water soluble complex cyanide of the group consisting of ferricyanides, cobalticyanides, nickelicyanides, molybdicyanides, mercuricyanides, complex cyanides of zinc, copper, and silver, and mixtures of such complex cyanides, the polymerization being carried out in an inert atmosphere.

8. The process which comprises polymerizing 2-chloro-1,3-butadiene in aqueous emulsion in the presence of a water-soluble ferricyanide.

9. The process which comprises polymerizing 2-chloro-1,3-butadiene in aqueous emulsion in the presence of a peroxide compound and a water-soluble ferricyanide.

10. The process which comprises polymerizing 2-chloro-1,3-butadiene in aqueous emulsion in the presence of a persulfate and a water-soluble ferricyanide and in an inert atmosphere.

11. The process which comprises polymerizing 2-chloro-1,3-butadiene in aqueous emulsion in the presence of potassium persulfate and potassium ferricyanide and in an atmosphere of nitrogen.

12. The process which comprises polymerizing a polymerizable material which is preponderantly 1,3-butadiene in aqueous emulsion in the presence of a water soluble complex cyanide of the group consisting of ferricyanides, cobalticyanides, nickelicyanides, molybdicyanides, mercuricyanides, complex cyanides of zinc, copper, and silver, and mixtures of such complex cyanides.

13. The process which comprises polymerizing a polymerizable material which is preponderantly 1,3-butadiene in aqueous emulsion in the presence of a water soluble complex cyanide of the group consisting of ferricyanides, cobalticyanides, nickelicyanides, molybdicyanides, mercuricyanides, complex cyanides of zinc, copper, and silver, and mixtures of such complex cyanides, the polymerization being carried out in an inert atmosphere.

14. The process which comprises polymerizing 1,3-butadiene in aqueous emulsion in the presence of a peroxide compound and a water soluble complex cyanide of the group consisting of ferricyanides, cobalticyanides, nickelicyanides, molybdicyanides, mercuricyanides, complex cyanides of zinc, copper, and silver, and mixtures of such complex cyanides.

15. The process which comprises polymerizing 1,3-butadiene in aqueous emulsion in the presence of a peroxide compound and a water soluble complex cyanide of the group consisting of ferricyanides, cobalticyanides, nickelicyanides, molybdicyanides, mercuricyanides, complex cyanides of copper, zinc, and silver, and mixtures of such complex cyanides, the polymerization being carried out in an inert atmosphere.

16. The process which comprises polymerizing 1,3-butadiene in aqueous emulsion in the presence of a water-soluble ferricyanide.

17. The process which comprises polymerizing 1,3-butadiene in aqueous emulsion in the presence of a peroxide compound and a water-soluble ferricyanide.

18. The process which comprises polymerizing 1,3-butadiene in aqueous emulsion in the presence of a persulfate and a water-soluble ferricyanide and in an inert atmosphere.

19. The process which comprises polymerizing 1,3-butadiene in aqueous emulsion in the presence of potassium persulfate and potassium ferricyanide and in an atmosphere of nitrogen.

20. The method which comprises subjecting an alkaline aqueous emulsion containing a butadiene-1,3 hydrocarbon and a monovinyl compound copolymerizable therewith in aqueous emulsion, to agitation and polymerization in the presence of alkali ferricyanide as the sole oxidizing catalyst.

MORTIMER A. YOUKER.

REFERENCES CITED

The following references are of record in the file of this patent:

UNITED STATES PATENTS

| Number | Name | Date |
| --- | --- | --- |
| 2,234,076 | Gumlich | Mar. 4, 1941 |
| 2,264,173 | Collins | Nov. 25, 1941 |